United States Patent
Castro

[19]

[11] Patent Number: 6,158,793
[45] Date of Patent: Dec. 12, 2000

[54] CONCEALABLE SUPPORT FOR AUTOMOTIVE ACCESSORY

[76] Inventor: Jose Castro, 5280 Caminito Exquisito, San Diego, Calif. 92130

[21] Appl. No.: 09/106,508

[22] Filed: Jun. 29, 1998

[51] Int. Cl.⁷ ..................................................... B65J 9/00
[52] U.S. Cl. .......................... 296/1.1; 293/24.1; 224/548
[58] Field of Search ................................... 224/929, 939, 224/548, 551–553, 570–571; 379/454, 435, 446; 296/1.1, 24.1

[56] References Cited

U.S. PATENT DOCUMENTS

| | | | |
|---|---|---|---|
| 2,435,816 | 2/1948 | Anderson | 379/454 |
| 2,663,764 | 12/1953 | Holmes | 379/454 |
| 2,702,836 | 2/1955 | Duncan | 379/454 |
| 2,712,039 | 6/1955 | Hlems | 379/454 |
| 2,766,330 | 10/1956 | Olsen | 379/454 |
| 2,770,682 | 11/1956 | Malone | 379/454 |
| 2,961,498 | 11/1960 | Snow | 379/454 |
| 3,172,964 | 3/1965 | Bulmer | 379/454 |
| 3,345,470 | 10/1967 | Hoffman | 379/454 |
| 4,842,174 | 6/1989 | Sheppard et al. | 224/929 |
| 4,854,538 | 8/1989 | Von Schalscha | 224/929 |
| 5,187,744 | 2/1993 | Richter | 224/570 |
| 5,799,914 | 9/1998 | Chivallier et al. | 224/929 |

*Primary Examiner*—Joseph D. Pape
*Assistant Examiner*—Kiran Patel
*Attorney, Agent, or Firm*—Henri J. A. Charmasson; John D. Buchacha

[57] ABSTRACT

A collapsible and concealable stand or pulpet for holding a device such as a cellular phone handset or an electronic map within arm's reach of an automotive vehicle driver, comprises a cradle or platform supported by an articulated or flexible arm that is secured by a rotating and swiveling joint to the floor of the vehicle or to a seat anchoring bracket. The stand can be folded down and rotated in a horizontal plane to place the device out of sight under the driver's or passenger's seat.

7 Claims, 3 Drawing Sheets

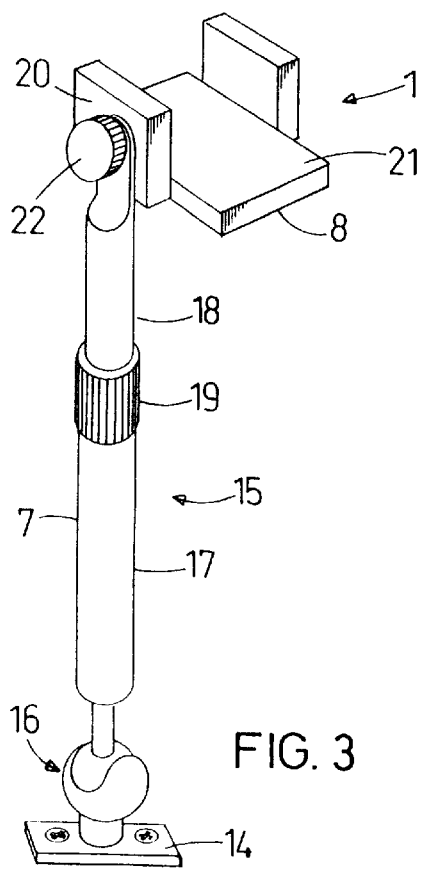
FIG. 3
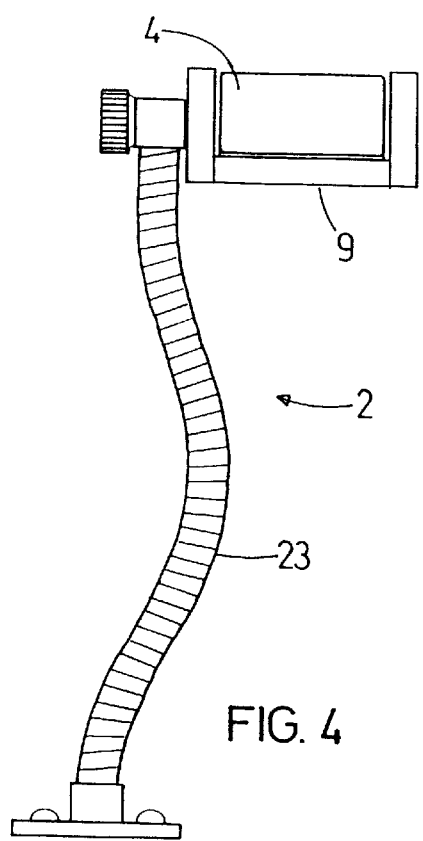
FIG. 4
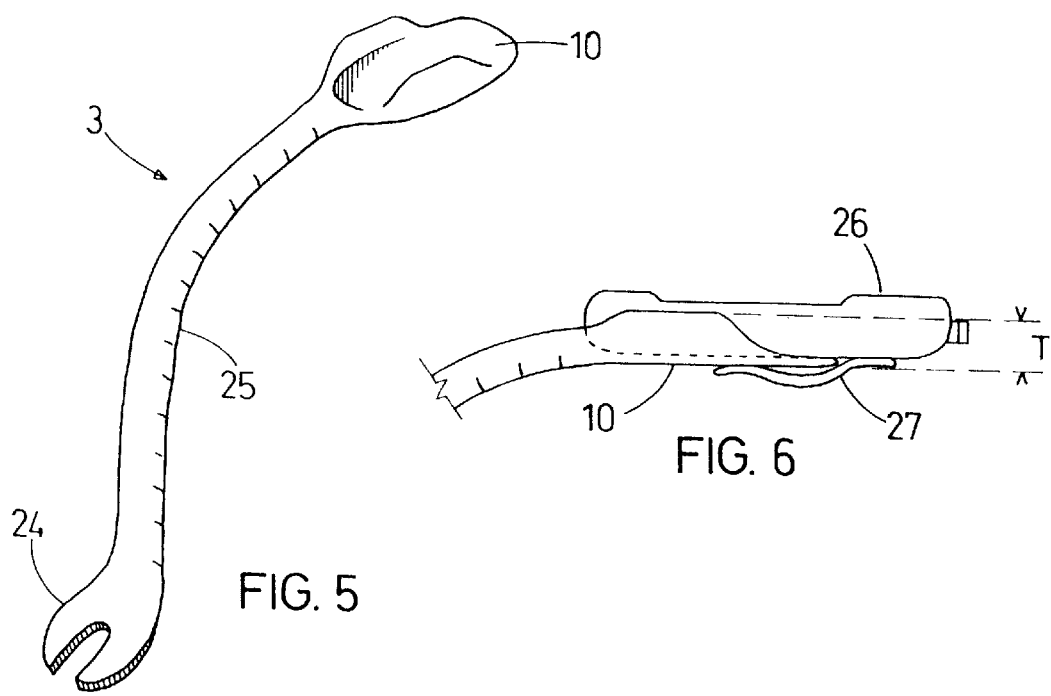
FIG. 5
FIG. 6

CONCEALABLE SUPPORT FOR AUTOMOTIVE ACCESSORY

FIELD OF THE INVENTION

This invention relates to automotive accessories, and to floor stands for supporting electronic devices.

BACKGROUND OF THE INVENTION

Electronic devices such as cellular phones, calculators, and directional aids which may be used by an automobile driver, and which are not part of the original equipment of the vehicle, need to be mounted within arm's reach. Various types of stands and brackets are currently available for that purpose. These stands or brackets are usually attached to the dashboard, on the central console spanning the drive shaft tunnel, on the floor of the vehicle, or on a seat anchoring bracket. Because those electronic devices are prime targets for thieves, they must be removed from their stand and hidden away in the glove compartment, under one of the seats, or carried away by the automobile owner when the vehicle is left unattended. The presence of an empty stand is a telltale sign that the coveted device might be present somewhere in the vehicle.

The present invention results from efforts to provide a way of concealing both the device and the stand when the vehicle is left unattended.

SUMMARY OF THE INVENTION

The principal and secondary objects of this invention are to provide a convenient way to mount an electronic device such as a cellular phone handset within arms reach of the driver of a vehicle when the vehicle is being operated, and out of sight of prowlers and potential thieves when the vehicle is left unattended.

These and other valuable objects are achieved by mounting the electronic device on a stand which is secured to the floor of the vehicle or a vehicle's seat mounting bracket by means of an articulated arm that allows for conveniently collapsing the stand into an horizontal position then rotating it to place the device under one of the front seats. In order to reduce the profile of the plate mounting the device and the upper section of the arm attached to it well below the 7 to 12 centimeters of space available between the floor and the under surface of the seat, the arm is connected to an edge or side of the mounting plate by a an adjustably rotatable joint.

BRIEF DESCRIPTION OF THE DRAWING

FIG. 3 is a perspective view of a first type of stand;

FIG. 4 is a a front elevational view of a second type of stand;

FIG. 5 is a perspective view of a third type of stand;

FIG. 6 is a partial side view supporting a cellular handset;

DESCRIPTION OF THE PREFERRED EMBODIMENTS OF THE INVENTION

Figure 1:
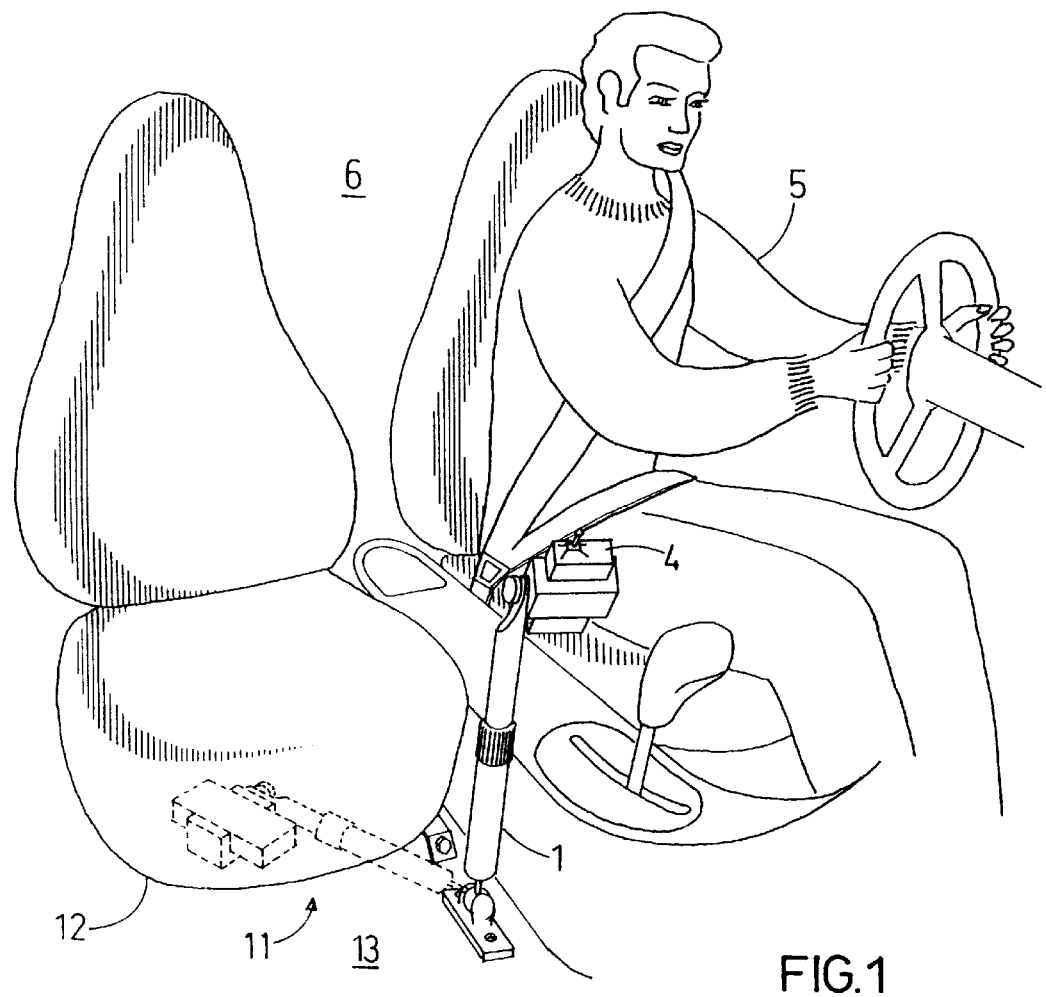
FIG. 1 is a diagrammatical illustration of the position of the electronic mounting stand within the cabin of a vehicle.

Referring now to the drawing, there is shown a series of three vehicle accessory stands or holders 1, 2 3 primarily intended to hold a cellular phone or other automotive accessory 4 within arm's reach of a driver 5 occupying a vehicle cabin 6 as shown in FIG. 1.

Figure 2:
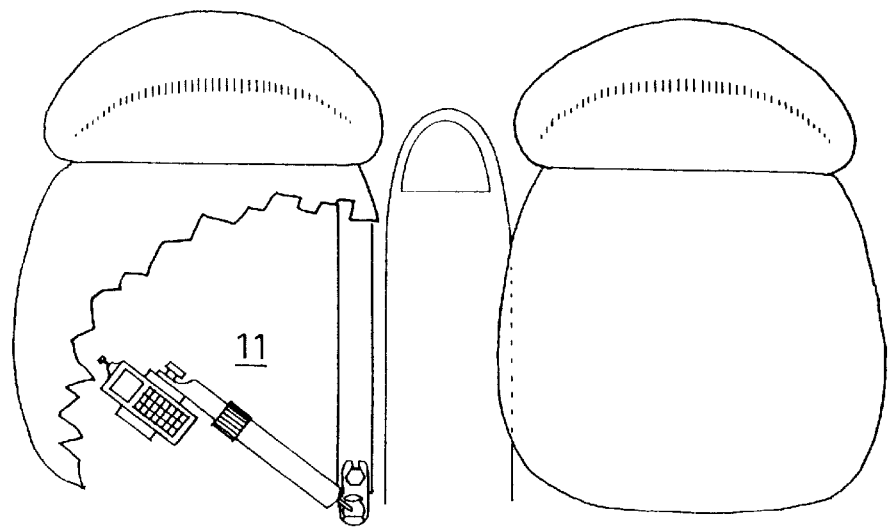
FIG. 2 is a top plan view showing the stand in its stowed position under a seat.

Each of the three embodiments of the stands is characterized by its collapsible property that permits the hiding of the accessory under one of the cabin seats without removing it from the stand. Basically, the articulated arm 7 or flexible arm 23, 25 of the stand and the accessory supporting platform or plate 8, 9, 10 can be placed in a near horizontal position, and assume a very thin profile, allowing the whole assembly to be moved under the tight space 11 between the bottom surface 12 of the seat and the underlying floor surface 13 as shown in FIG. 2. This space usually has a height clearance of no more than 7.5 centimeters (3 inches). Contrary to what has been offered in the prior art, where the accessory-holding platform is held by, and connected to the upper end of the supporting arm about its undersurface. The instant invention provides for a connection of the supporting arm to an edge of the platform.

The first embodiment illustrated in FIG. 3 comprises a base 14 suitable for attachment an anchor point to the vehicle floor, to a low area of a central console, or to the drive shaft tunnel near the base of one of the front seats. The base 14 of the stand is connected to the base end of the arm 15 by a ball-and-socket assembly 16. This assembly allows for swiveling and rotational movements of the arm in relationship to the base about a variety of vertical, horizontal, and near vertical or horizontal axes. The arm 15 comprises two telecopically engaged elements 17, 18, and includes a locking ring 19 used to lock the arms in the desired length configuration. The upper element 18 of the arm is connected to the side or edge surface 20 of the accessory-supporting platform or plate 8 by a rotating joint having a rotational axis parallel to the support surface 21. A knob-nut 22 is used for locking the platform at a variety of angular positions in relation to the arm. Accordingly, in the stowed position illustrated in FIG. 2, the platform can be placed in the same plane as the arm.

In the second embodiment illustrated in FIG. 4, the arm 23 consists of a length of flexible tubing which can be bent by hand with a minimum of force, yet remains sufficiently stable in any position to support the weight of the accessory 4. Several types of such a flexible tubing is readily available from various manufacturers. Some types are made of a coiled metal strip, some others consist of daisy-chains of ball-and-socket joints. The upper end of the arm is rotatively connected to the platform, in the same manner as in the first embodiment of FIG. 3.

In the third embodiment of the invention illustrated in FIGS. 5 and 6, the base consists of an anchoring lug 24 which can be inserted under one of the screws or nuts securing one of the seats to the floor of the vehicle. The arm 25 is also made from a length of flexible tubing. The accessory-holding plate 10 is an axial extension of the arm. Accordingly, the arm and plate together have a lateral profile or thickness T of no more than 1.875 centimeters (0.75 inch). The thickness of the platform 10 does not exceed 0.5 centimeters (0.2 inch) so that a telephone handset 26 having a bent clip 27 can be securely attached to the plate by means of that clip as illustrated in FIG. 6. Attachment of the accessory to the plate may be secured by hook-and-vane types of fabric fastener, tacky tape, or any such well-known technique.

Figure 7:
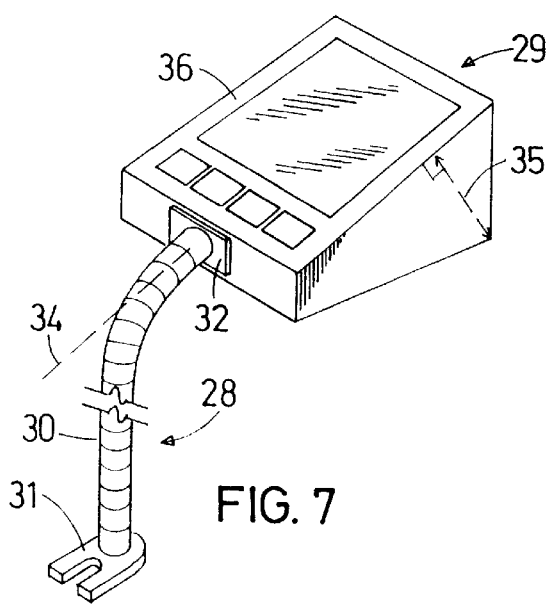
FIG. 7 is a perspective view of a fourth type of stand.
Figure 8:
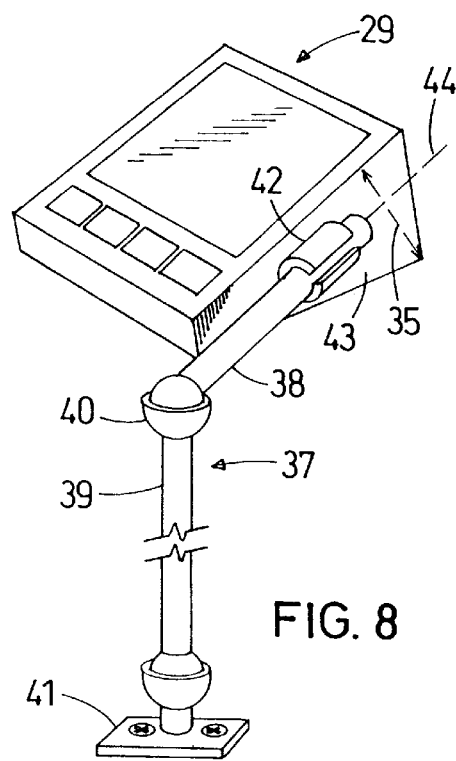
FIG. 8 is a perspective view of a fifth type of stand.

A fourth embodiment 28 of the invention illustrated in FIG. 7 is designed to mount an information-dispensing device such as an automotive navigation device 29, or a small computer, and comprises a flexible arm 30 having an anchoring lug 31 at the base end of the arm. The upper end of the arm is permanently attached to the device 29 by an attachment mechanism 32. In this case, the arm 30 is attached to the device about one of its multiple faces 33. Moreover, the axial direction 34 of attachment of the arm to the face 33 of the device lies in a plane substantially perpendicular to the shortest height 35 achievable when the device is lying on any one of its faces. In this case, when lying on its top face 36. The fifth embodiment of the arm 37 illustrated in FIG. 8 comprises two segments 38, 39 articulately joined by a ball-and-socket joint 40. The anchoring base 41 is also articulately attached to the lower end of one of the lower segments 39. This embodiment of the arm is designed to be attached to a similar information-dispensing device 29. The attachment mechanism in this case comprises a resilient clip 42 which engages the distal part of the upper segment 38 of the arm. It should be noted that the attachment mechanism is oriented on a lateral face 43 of the device so that the axis 44 of the upper segment 38 lies in a plane substantially perpendicular to the shortest height 35.

Figure 9:
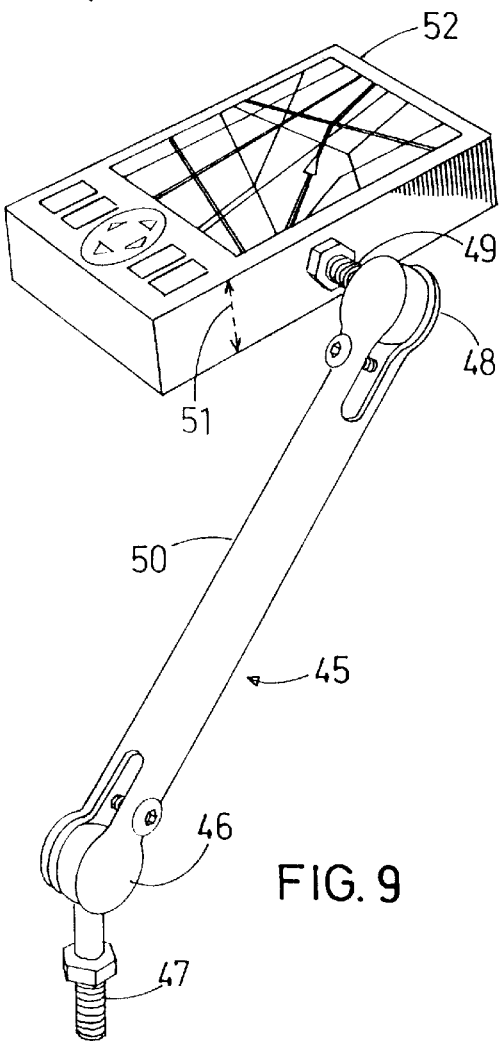
FIG. 9 is a perspective view of a sixth type of stand.

In the sixth embodiment 45 of the invention illustrated in FIG. 9, a first ball-and-socket joint 46 is provided near the anchoring bolt 47, and a second ball-and-socket joint 48 is used to connect the attachment bolt 49 to the upper end of the arm 50. The two ball-and-socket joints can be adjusted and locked at multi-angular positions. It should be noted that the attachment bolt 49 also lies in a plane substantially perpendicular to the shortest height 51 of the supported device 52.

Accordingly, when either one of the fourth, fifth or sixth embodiments of the invention is collapsed to a horizontal position, the overall profile of the combination of the device 29 and the supporting arm or stand 28, 37 is reduced to the smallest height achievable, thus facilitating the shifting of the device under a nearby seat.

While the preferred embodiments of the invention have been described, modifications can be made and other embodiments may be devised without departing from the spirit of the invention and the scope of the appended claims.

What is claimed is:

1. The combination of a vehicle cabin including a floor, a seat, said seat having a bottom surface spaced apart from said floor with a concealable holder for mounting a device, said holder being positioned and dimensioned to place said device within arm's reach of a driver of said vehicle, wherein said holder comprises:

a supporting surface shaped and dimensioned to receive and hold said device;

an articulated arm secured at an upper end to said holder and at a base end to said cabin proximate said seat;

said arm being alternately erectable into a substantially vertical position, and collapsible into a substantially horizontal position, said arm being further rotatable in said horizontal position about said base end around a vertical axis to bring said holder under the bottom surface of said seat; and said holder having a side surface;

wherein said upper end is secured to said side surface along an axis parallel to said supporting surface.

2. The combination of claim 1, wherein the vertical distance between said floor and any part of said holder in said horizontal position is less than about 7.5 centimeters.

3. The combination of claim 2, wherein said articulated arm comprises two members telescopically and adjustably engaged with each other.

4. The combination of claim 2, wherein said articulated arm further comprises a ball-and-socket joint assembly at said second end.

5. The combination of claim 2, wherein said articulated arm comprises a flexible section.

6. The combination of claim 2, wherein said device comprises a telephone handset.

7. A collapsible holder for holding a cellular phone handset within arm's reach of an automotive vehicle driver, said holder comprising:

a support surface shaped and dimensioned to receive and hold said handset, and a side surface;

an articulated arm secured at an upper end to said side surface, and at a base end to an anchor point proximate a seat base;

said arm being alternately erectable into a substantially vertical position, and collapsible into a substantially horizontal position;

said arm being rotatable in said horizontal position about a vertical axis to bring said holder under a seat bottom surface; and wherein said upper end is rotatively secured to said side surface along an axis substantially parallel to said support surface.

* * * * *